United States Patent [19]
Nellums et al.

[11] Patent Number: 4,874,070
[45] Date of Patent: Oct. 17, 1989

[54] CONTROL FOR AMT SYSTEM START FROM STOP OPERATION

[75] Inventors: Richard A. Nellums, Astley Park, England; Eugene R. Braun, Royal Oak, Mich.

[73] Assignee: Eaton Corporation, Cleveland, Ohio

[21] Appl. No.: 154,396

[22] Filed: Feb. 10, 1988

[51] Int. Cl.$^4$ .............................................. B60K 41/02
[52] U.S. Cl. ............................... 192/0.052; 192/0.076; 192/0.092; 192/0.096
[58] Field of Search ............... 192/0.076, 0.096, 0.052, 192/0.092; 364/424.1

[56] References Cited

U.S. PATENT DOCUMENTS

| | | | |
|---|---|---|---|
| 3,105,395 | 10/1963 | Perkins | 74/745 |
| 3,478,851 | 11/1969 | Smyth et al. | |
| 3,776,048 | 12/1973 | Enomoto et al. | 74/866 |
| 3,942,393 | 3/1976 | Forster et al. | 74/866 |
| 3,974,720 | 8/1976 | Iijima | 74/866 |
| 4,038,889 | 8/1977 | Lindow et al. | 74/866 |
| 4,039,061 | 8/1977 | Pruvot et al. | 192/4 A |
| 4,061,217 | 12/1977 | Toyota et al. | 192/0.076 X |
| 4,073,203 | 2/1978 | Wurst et al. | 74/866 |
| 4,081,065 | 3/1978 | Smyth et al. | 192/0.076 |
| 4,208,929 | 1/1980 | Heino et al. | 74/731 |
| 4,226,295 | 10/1980 | Rembold et al. | 74/866 X |
| 4,253,348 | 3/1981 | Will et al. | 74/866 |
| 4,361,060 | 11/1982 | Smyth | 74/866 |
| 4,401,200 | 8/1983 | Heidemeyer et al. | 192/0.076 |
| 4,413,714 | 11/1983 | Windsor | 192/0.033 |
| 4,425,620 | 1/1984 | Batcheller et al. | 74/866 X |
| 4,432,445 | 2/1984 | Windsor | 192/0.076 |
| 4,463,427 | 7/1984 | Bonnetain et al. | 74/866 X |
| 4,493,228 | 1/1985 | Vukovich et al. | 74/858 |
| 4,509,625 | 4/1985 | Tellert | 192/0.033 |
| 4,527,447 | 7/1985 | Richards | 74/866 |
| 4,551,802 | 11/1985 | Smyth | 364/424.1 |
| 4,558,772 | 12/1985 | Grimes et al. | 192/0.076 |
| 4,576,263 | 3/1986 | Lane et al. | 192/0.044 |
| 4,595,986 | 6/1986 | Daubenspeck et al. | 364/424.1 |
| 4,618,043 | 10/1986 | Hattori et al. | 192/0.096 X |
| 4,623,052 | 11/1986 | Watanabe et al. | 192/0.076 X |
| 4,646,891 | 3/1987 | Braun | 192/0.032 |
| 4,678,069 | 7/1987 | Yoshimura et al. | 192/0.076 X |
| 4,732,246 | 3/1988 | Tateno et al. | 192/0.076 X |
| 4,766,544 | 8/1988 | Kurihara et al. | 192/0.052 X |

*Primary Examiner*—Rodney H. Bonck
*Attorney, Agent, or Firm*—H. D. Gordon

[57] ABSTRACT

A method for controlling an AMT system (10) is provided including sensing vehicle start from stop operation, determining a target engine speed value (A) based upon the operator setting of the throttle pedal (THL) and modulating the fuel supplied to the engine (FC) to cause the engine speed (N) to rapidly equal and then be maintained at said target engine speed value. The clutch (16) is engaged at a relatively slow first rate (106), or a relatively rapid second rate (126) depending upon the value of engine speed (N) relative to the target value (A) and upon the value of the amount (FC) and/or the rate of change of the amount (dFC/dt) of fuel supplied to the engine. The first rate of engagement is a function of, and varies directly with, the value of operator setting of the throttle (THL).

31 Claims, 3 Drawing Sheets

CONTROL FOR AMT SYSTEM START FROM STOP OPERATION

RELATED APPLICATIONS

This application is related to Ser. No. 154,562 titled CONTROL FOR VEHICLE START FROM STOP OPERATION filed the same day as this application and assigned to the same assignee as this application.

BACKGROUND OF THE INVENTION

1. Field of the Invention

This invention relates to vehicular automatic clutches as used with power transmissions providing a plurality of gear reduction ratios, such as automatic mechanical transmissions (i.e. "AMTs"), and, to control systems and methods therefor. In particular, the present invention relates to control systems and methods for automatic clutches as are utilized with automatic mechanical transmission systems wherein gear selection and shift decisions are made and/or executed based upon measured and/or calculated parameters such as vehicle or transmission output shaft speed, transmission input shaft speed, engine speed, throttle position, rate of change of throttle position, rate of change of vehicle and/or engine speed and the like. More particularly, the present invention relates to a method for controlling an automatic clutch and/or AMT system during a vehicle start from stop operation including controlling both the master clutch and the fuel supply to the engine.

2. Description of the Prior Art

The use of automatic transmissions of both the automatic mechanical type utilizing positive clutches and of the planetary gear type utilizing frictional clutches is well known in the prior art as are control systems therefor. Electronic control systems utilizing discrete logic circuits and/or software controlled microprocessors for automatic transmissions wherein gear selection and shift decisions are made based upon certain measured and/or calculated parameters such as vehicle speed (or transmission output shaft speed), transmission input shaft speed, engine speed, rate of change of vehicle speed, rate of change of engine speed, throttle position, rate of change of throttle position, full depression of the throttle (i.e. "kickdown"), actuation of the braking mechanism, currently engaged gear ratio, and the like are known in the prior art. Examples of such automatic/semiautomatic transmission control systems for vehicles may be seer by reference to U.S. Pat. Nos. 4,361,060; 4,595,986; 4,551,802; 4,527,447; 4,425,620; 4,463,427; 4,081,065; 4,073,203; 4,253,348; 4,038,889; 4,226,295; 3,776,048, 4,208,929; 4,039,061; 3,974,720; 3,478,851 and 3,942,393, the disclosures of which are all hereby incorporated by reference.

Automatic control systems/subsystems for automatically controlling the engagement and disengagement of AMT system vehicle master clutches, especially during vehicle start from stop operations, are known in the prior art as may be seen by reference to U.S. Pat. Nos. 4,081,065; 4,401,200; 4,413,714; 4,432,445, 4,509,625; 4,576,263 and 4,646,891, the disclosures of all of which are hereby incorporated by reference.

While the above referenced automatic/semiautomatic transmission control systems, especially the system illustrated in U.S. Pat. Nos. 4,081,065; 4,576,263 and 4,646,891 and similar systems, are effective to control the vehicle master clutch during start from stop operations under most conditions, under certain conditions, the response time of the actuators and the hysteresis of the clutch, especially where clutch release is required, may not be sufficiently rapid and/or may not provide an acceptably smooth engagement of the clutch.

SUMMARY OF THE INVENTION

In accordance with the present invention, the drawbacks of the prior art have been overcome or minimized by providing a control system, preferably an electronic control system, and control method, for automatic/semiautomatic mechanical transmission systems start from stop operation wherein the rate of clutch engagement and the throttle setting decisions are made and/or executed based upon measured and/or calculated parameters including at least input signals indicative of engine speed operator throttle demand and throttle position. Other inputs/parameters, such as signals indicative of transmission input shaft speed, transmission output shaft speed, rate of change of throttle position, condition of the master clutch, currently engaged gear ratio, operation of the vehicle brakes, and the like are also utilized to make decisions for control of the AMT system.

The predetermined logic rules or programs by which the various input signals are processed include a method for detecting a start from stop operation, for determining a target engine speed as a function of operator throttle demand, for modulating the throttle setting to cause the engine speed to rapidly achieve in a damped fashion or to maintain a value equal to the target engine speed and for causing the clutch to be engaged at a first relatively low rate which is a function of operator throttle setting or at a second relatively rapid rate depending upon the value of sensed engine speed relative to the target engine speed and the value of the throttle setting as a percentage of the operator throttle demand.

The advantages of the relatively rapid response of the throttle relative to the clutch, and the advantage of not having system control effected by clutch hysteresis are obtained as vehicle start from stop operation control is not based upon the modulation of the master clutch from engaging to disengaging movement thereof.

Accordingly, it is an object of the present invention to provide a new and improved control and control method for automatic clutch and throttle operation, especially as utilized with automatic mechanical transmission systems which involves sensing and identifying a start from stop vehicle operation, manipulating engine throttle to cause engine speed to achieve and maintain a target value depending upon operator throttle demand and causing the clutch to move towards full engagement at a relatively slower or relatively faster rate depending upon the value of the throttle setting relative to the value of operator throttle demand and the value of current engine speed relative to the target engine speed value.

This and other objects and advantages of the present invention will become apparent from a reading of the following description of the preferred embodiment taken in connection with the attached drawings.

DESCRIPTION OF THE PREFERRED EMBODIMENT

Figure 1:
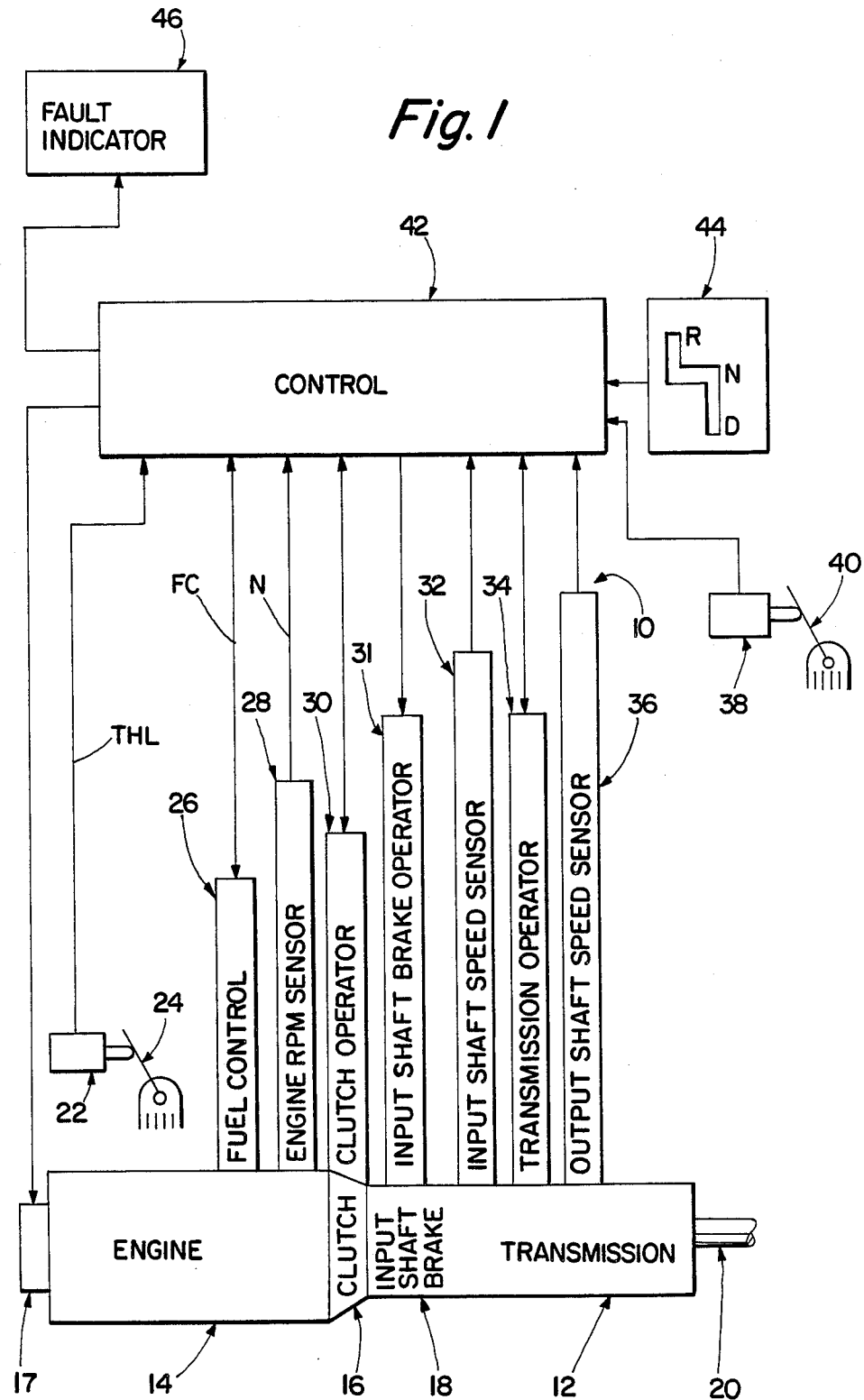
FIG. 1 is a schematic illustration of the components and interconnections of the automatic clutch and automatic mechanical transmission control system of the present invention.

FIG. 1 schematically illustrates an automatic mechanical transmission system 10 including an automatic multi-speed compound change gear transmission 12 driven by a throttle controlled engine 14, such as a well known diesel engine, through a master clutch 16. An engine brake, such as an exhaust brake 17 for retarding the rotational speed of engine 14 and/or an input shaft brake 18 which is effective to apply a retarding force to the input shaft upon disengagement of master clutch 16 may be provided as is known in the prior art. The output of automatic transmission 12 is output shaft 20 which is adopted for driving connection to an appropriate vehicle component such as the differential of a drive axle, a transfer case or the like as is well known in the prior art.

The above mentioned power train components are acted upon and monitored by several devices, each of which will be discussed in greater detail below. These devices include a throttle position (THL) or throttle opening monitor assembly 22 which senses the position of the operator controlled vehicle throttle or other fuel throttling device 24, a fuel control device 26 for controlling the amount of fuel (FC) to be supplied to engine 14, an engine speed sensor 28 which senses the rotational speed (N) of the engine, a clutch operator 30 which engages and disengages clutch 16 and which also supplies information as to the status of the clutch, an input brake operator 31, a transmission input shaft speed sensor 32, a transmission operator 34 which is effective to shift the transmission 12 into a selected gear ratio and to provide a signal indicative of currently engaged ratio, and a transmission output shaft speed sensor 36. A vehicle brake monitor 38 senses actuation of vehicle brake pedal 40. Of course, as is known from above-mentioned U.S. Pat. Nos. 4,038,889 - Col. 4, lines 17-25; 4,073,203, - Col. 3, lines 53-56; 4,081,065 - Col. 3, lines 6-10; 4,361,060 -Col. 5, lines 30-37; and 4,463,427 - Col. 3, lines 12-32 an input signal indicative of an engine value dependent upon engine fueling, such as a signal indicative of engine torque, may be used in place of the throttle position signal.

The above mentioned devices supply information to and/or accept commands from a central processing unit or control 42. The central processing unit 42 may include analogue and/or digital electronic calculation and logic circuitry, the specific configuration and structure of which forms no part of the present invention. The central processing unit 42 also receives information from a shift control assembly 44 by which the vehicle operator may select a reverse (R), neutral (N), or forward drive (D) mode of operation of the vehicle. An electrical power source (not shown) and/or source of pressurized fluid (not shown) provides electrical and/or pneumatic power to the various sensing, operating and-/or processing units. A fault indicator or alarm 46 may display the identity of a specific fault or simply signal the existence of an unidentified fault. Drive train components and controls therefor of the type described above are known in the prior art and may be appreciated in greater detail by reference to above mentioned U.S. Pat. Nos. 4,361,060; 4,595,986; 3,776,048; 4,038,889 and 4,226,295.

Sensors 22, 28, 32, 36, 38 and 44 may be of any known type or construction for generating analogue or digital signals proportional to the parameter monitored thereby. Similarly, operators 17, 18, 26, 30 and 34 may be of any known electrical, pneumatic or electropneumatic type for executing operations in response to command signals from processing unit 42. Fuel control 26 will normally supply fuel to engine 14 in accordance with the operator's setting of throttle 24 but may supply a lesser (fuel dip) or greater (fuel boost) amount of fuel in accordance with commands from control unit 42. If the setting (FC) of the fuel control 26 differs from the setting (THL) of throttle 24, the fuel control will be ramped up or down, as appropriate, to match the throttle setting. One control system for adjusting fuel control in view of throttle setting is, by way of example only, illustrated in U.S. Pat. No. 4,493,228, the disclosure of which is hereby incorporated by reference.

While the control system of the present invention is particularly well suited for use with automatic clutches associated with AMT systems, the system is also applicable to vehicle start from stop operation in vehicles not having an AMT system.

The purpose of the central processing unit 42 is to select, in accordance with a program (i.e. predetermined logic rules) and current or stored parameters, the optimal gear ratio at which the transmission should be operating and, if necessary, to command a gear change, or shift, into the selected optimal gear ratio based upon the current and/or stored information.

The various functions to be performed by central processing unit 42, and a preferred manner of performing same may be seen in greater detail by reference to U.S. Pat. No. 4,595,986, and to published Society of Automotive Engineers SAE Paper No. 831776 published November 1983, the disclosures of which are hereby incorporated by reference.

Referring to the vehicle start from stop mode of operation of AMT system 10, fuel control 26 and clutch operator 30 are controlled as follows.

When the vehicle operator wishes to start, he will release the brake 40 and depress throttle pedal 24. The control, or central processing unit 42, which is preferably microprocessor based, will calculate or determine a target engine speed value (A) as a function of the sensed operator throttle setting (THL). THL is usually expressed as a percentage of wide open or full throttle and the target engine speed A is preferably an estimation of the engine speed (N) anticipated by the vehicle operator at a given throttle pedal setting (THL).

Figure 2:
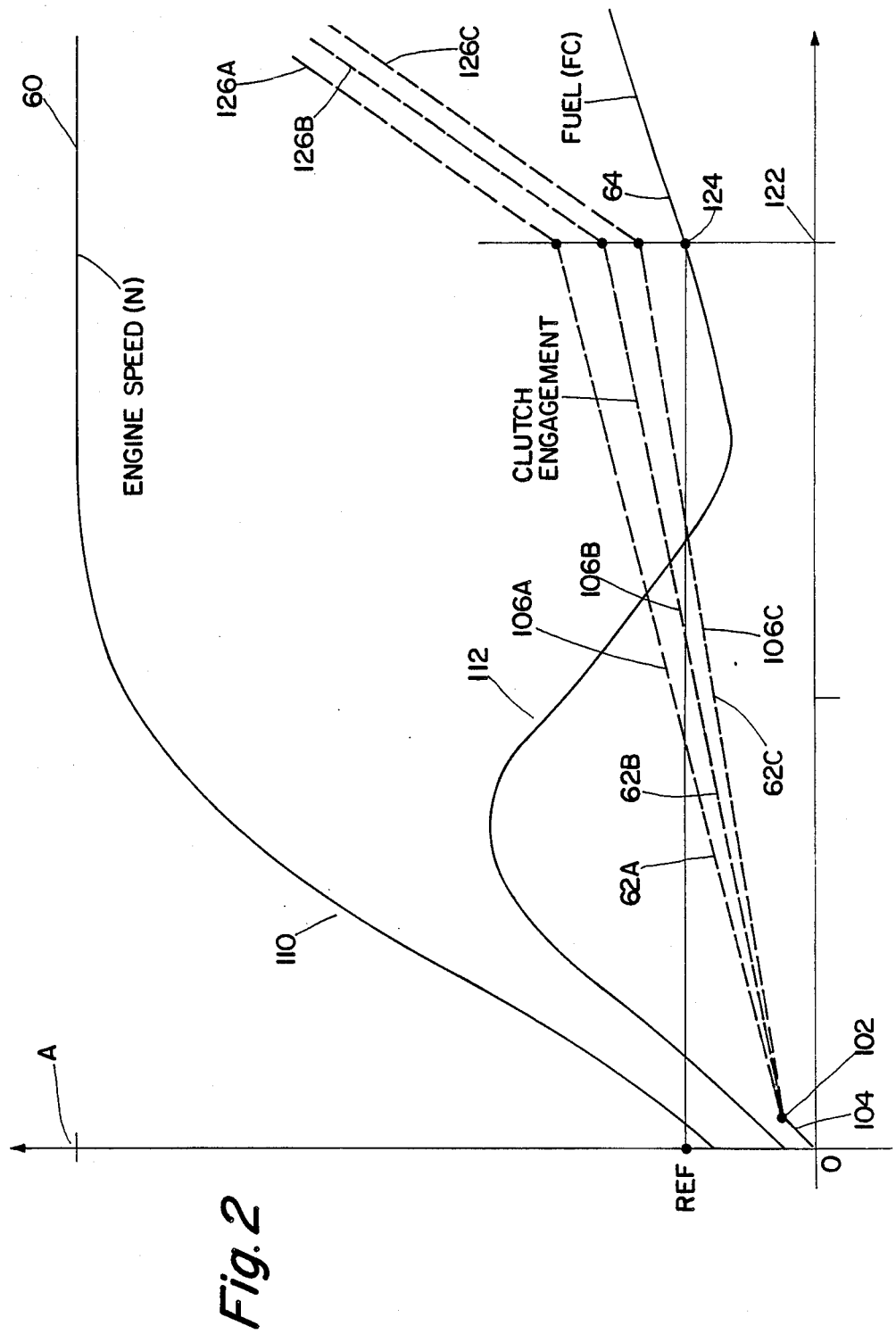
FIG. 2 is a time graph of the values of engine speed, throttle position and clutch engagement during a start from operation using the control/control the present invention.

FIG. 2 is a time graph of a typical vehicle start from stop operation performed in accordance with the control method of the present invention. Line 60 illustrates the value of engine speed, lines 62A, 62B and 62C represent the value of clutch engagement with zero representing the clutch in the fully disengaged position and increasing to the fully engaged condition of the clutch, and line 64 represents the amount of fuel provided to the engine by the fuel control device 26 responding to the FC signal from the central processing unit 42.

In the initial stage, the driver presses the accelerator or throttle pedal 24 to a position which will depend upon whether he desires to make a gentle start or a severe start. As the clutch 14 starts to engage, the control will cause the clutch to move rapidly from the fully disengaged position to a point of incipient engagement 102 as represented by segment 104 of lines 62A, 62B and 62C. Having achieved incipient engagement, the clutch will continue to be moved toward engagement at a relatively low rate as indicated by segments 106A, 106B and 106C of lines 62A, 62B and 62C, which rate is selected to provide a smooth initial engagement of the clutch and which rate may be fixed or variable as a function of the value of the operator set throttle signal THL. If the rate of engagement will be increased as the value of THL is increased, and, if THL is varied during a start from stop operation, the rate will vary accordingly.

At this initial stage, fuel will be supplied to the engine in a manner to rapidly increase the engine speed from the idle speed to the target speed A in a rapid but damped matter illustrated by portion 110 of engine speed line 60 and portion 112 of fuel line 64.

At a certain point in time 122, the value of engine speed N will be equal to the target engine speed A, the value of fuel supplied to the engine 124 will be equal to or greater than the predetermined reference value (REF), such as 5% to 35% of the maximum amount of fuel which can be supplied to the engine (FC) and the rate of change (dFC/dt) of the value of fuel will be positive which conditions are an indication that the engine is developing sufficient torque and that the drive line is sufficiently wound up for the clutch to be applied at a considerably increased rate as indicated by segments 126A, 126B, 126C of lines 62A, 62B and 62C.

It may be seen, that control of a start from stop operation in accordance with the control method of the present invention does not require clutch release or decreased engagement of the clutch to maintain control of the system and does utilize the relatively rapid response of the system to variations in the amount of fuel supplied to the engine as the primary controlling parameter. The relatively lower rates of clutch engagement vary with the values of the THL signal and may also vary with the ratio of the starting gear. The value 124 of fuel at which the rate of clutch engagement is increased from the relatively low to the relatively rapid rates may be fixed or may vary with the values of the THL signal and/or the rate of change of the THL signal and/or the ratio of the starting gear.

Upon achieving full engagement of the clutch 16, the control fuel supplied to the engine returns to the operator, i.e. FC is set equal to THL until such time as a shift transient and/or a start from stop operation occurs.

As used herein, the phrase engagement of the clutch involves moving the clutch actuator toward fuller engagement of the clutch elements.

Figure 3:
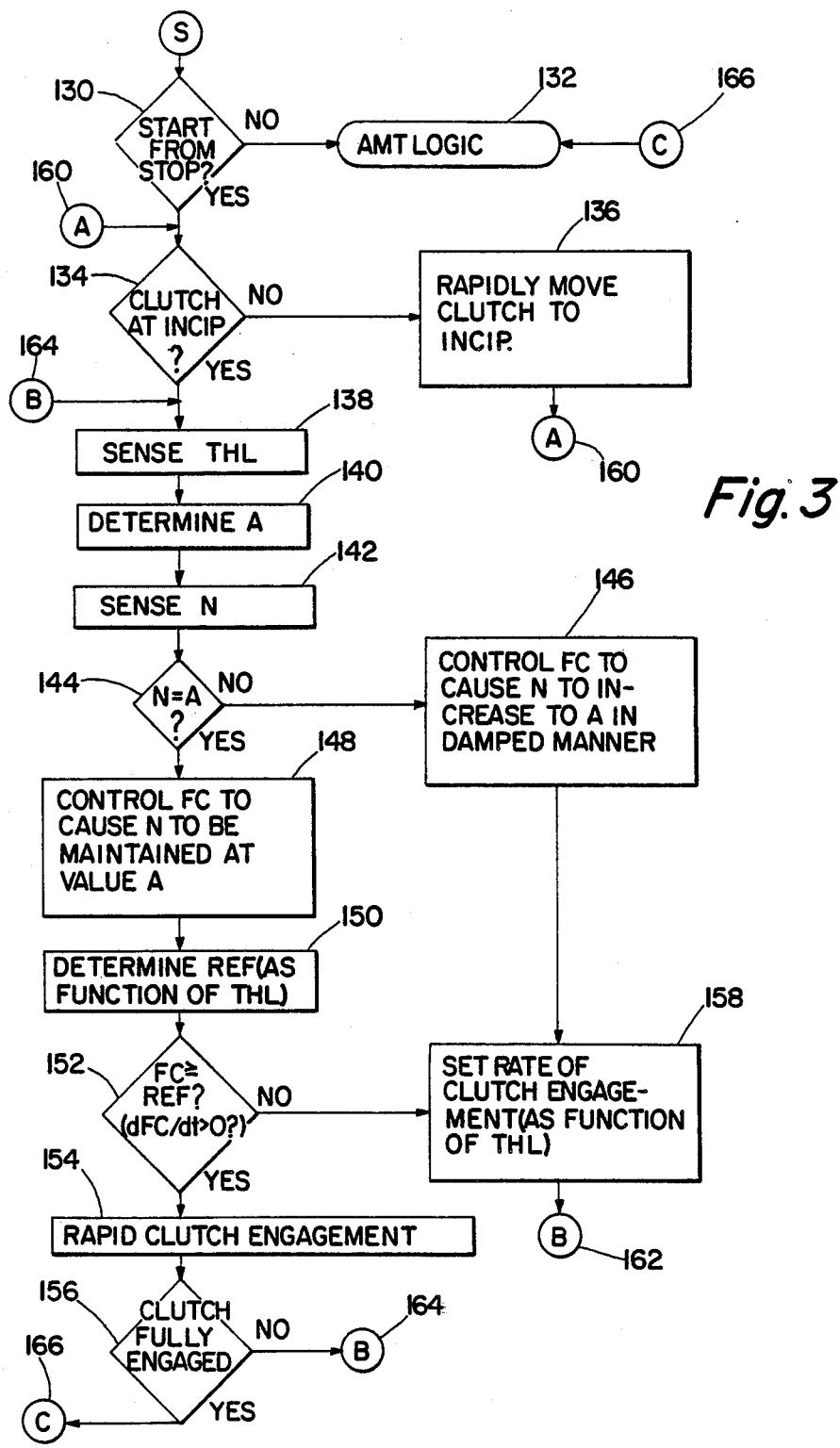
FIG. 3 is a symbolic illustration, in the form of a flow chart, illustrating the preferred manner of practicing the method of the present invention.

FIG. 3 is a symbolic representation, in the form of a flow chart, of the method of the present invention. Briefly, at decision block 130, the CPU will determined if a start from stop operation is occurring. If start from stop conditions are not occurring, the logic will exit from the start from stop subroutine to the remainder of the AMT logic 132. Otherwise, as indicated at decision block 134 and operation block 136, if clutch 16 is not in at least incipient engagement, it is rapidly moved to the position of incipient engagement. If clutch incipient engagement has been achieved, THL will be sensed at operation block 138 a value of A will be determined as indicated at operation block 140. Engine speed N will be sensed as indicated at operation block 142 and the current value of engine speed N will be compared to the value of A as indicated at decision block 144. As indicated at operation blocks 146 and 148, respectively, the value of fuel supplied to the engine, i.e. the value of the signal FC will be modulated to cause the engine speed N to either increase to the value A in a damping effect or to maintain the engine speed N equal to the value of A, respectively.

If engine speed N equals and is maintained at the target value A, as shown in operation block 148, a reference value REF is determined at operation block 150 and, at decision block 152, it is determined if the value of the signal FC, is equal or greater than a value REF. Decision block 152 may also require that the rate of change of the signal FC, with respect to time (i.e. dFC/dt) is positive (and that N equals A). If all of the conditions of decision block 152 are true, the clutch is caused to rapidly engage as indicated in operational block 154 and then it is determined if the clutch is fully engaged at decision block 156. If the clutch is fully engaged, fuel control is returned to the operator and the start from stop sub-routine is exited. If the clutch is not fully engaged, the logic is re-entered at point B.

If the engine speed (N) does no equal the target value (A), or if the amount of fuel (FC) currently being supplied to engine 14 to maintain engine speed (N) at the target value (A) does not equal or exceed the reference value (REF), the clutch is caused to engage at a slower rate which is a function of THL, see operation block 158.

The method illustrated in FIG. 3 indicates a start from stop clutch engagement operation which proceeds until the clutch is fully engaged. As indicated in abovementioned U.S. Pat. No. 4,595,986, this loop may be performed rapidly and repeatedly in the time required for the actuators to react to command output signals from the CPU 42. In such situations, junctions 160 and 164 will lead to junction 166.

Although the AMT system 10 has been described as utilizing a microprocessor based control 42 and the methods and operations carried out as software modes or algorithms, it is clear that the operations can also be carried out in electronic/fluid logic circuit comprising discrete hardware components.

Transmission 12 may include synchronizing means such as an accelerator and/or brake mechanism as described in U.S. Pat. No. 3,478,851, hereby incorporated by reference. The transmission 12 is preferably, but not necessarily, of the twin countershaft type as seen in U.S. Pat. No. 3,105,395, hereby incorporated by reference.

Although the present invention has been set forth with a certain degree of particularity, it is understood that various modifications are possible without departing from the spirit and scope of the invention as hereinafter claimed.

We claim:

1. A method for controlling a vehicle start from stop system (10) for vehicles having an operator actuated throttle pedal (24), a fuel control (26) for controlling the amount of fuel supplied to a fuel controlled engine (14), a transmission (12) having a plurality of gear ratio combinations selectively engagable between a transmission input shaft and a transmission output shaft (20), said transmission input shaft being operatively connected to said engine by means of a selectively engagable and disengagable friction clutch (16), said start from stop system comprising an information processing unit (42) having means for receiving a plurality of input signals including an input (N) signal indicative of the rotational speed of the engine and an input signal (THL) indicative of the operator setting of the throttle pedal, said processing unit including means for processing said input signals in accordance with predetermined logic rules for determining a reference value (REF) equal to a predetermined percentage of maximum fuel supply to the engine and for generating command output signals whereby said system is operated in accordance with said logic rules, and means (26, 30, 34) associated with said system effective to actuate said transmission system in response to said command output signals from said processing unit;

said processing unit having means to sense vehicle start from stop operation and, in a vehicle start from stop operation, issuing command output signals to clutch control means (30) for controlling the rate of engagement of said clutch and to fuel control means (26) for controlling the amount of fuel (FC) supplied to said engine; the method characterized by:

setting a target engine speed value (A) as a function of the operator setting (THL) of the throttle pedal (138, 140);

modulating the amount of fuel supplied to the engine to cause the engine speed of rapidly, in a damped manner, substantially equal said target engine speed and then modulating the amount of fuel to said engine to cause said engine speed to be maintained at said target engine speed value (146, 148); and causing said clutch to engage at a first rate of engagement (106) until engine speed (N) has been caused to equal and be maintained at said target value (A) and the amount of fuel (FC) currently being supplied to the engine is equal to or greater than said reference value (REF), then causing said clutch to be engaged at a second (126) more rapid rate of engagement.

2. The method of claim 1 wherein said first rate of engagement is a function of the value (THL) of the operator's setting of the throttle.

3. The method of claim 1 wherein said first rate of engagement increases with increases in the value (THL) of the operators setting of the throttle.

4. The method of claim 1 wherein said reference value (REF) is a function of the value (THL) of the operator setting of the throttle.

5. The method of claim 1 wherein said first rate of clutch engagement is a function of the gear ratio of the transmission in the start from stop operation.

6. The method of claim 1, wherein said first rate of engagement is a relatively slow rate of engagement selected to provide relatively smooth start from stop operations.

7. The method of claim 1, wherein said reference value (REF) is a function of the transmission engaged ratio utilized for start from stop operations.

8. The method of claim 1, wherein said processing unit comprises means to calculate the value of the rate of change of the amount of fuel currently supplied to the engine (dFC/dt) and after the engine speed (N) has been caused to equal and be maintained at the target engine speed value (A), causing said clutch to be engaged at said second rate of engagement only if both the amount of fuel currently supplied to the engine (FC) is equal to or greater than said reference value (REF) and the rate of change of the amount of fuel currently supplied to the engine is positive.

9. The method of claim 1, wherein said second rate of engagement is the most rapid rate of engagement available for engaging said clutch.

10. The method of claim 4 wherein said processing unit comprises means to calculate the value of the rate of change of the amount of fuel currently supplied to the engine (dFC/dt) and after the engine speed (A) has been caused to equal and be maintained at the target engine speed value (A), causing said clutch to be engaged at said second rate of engagement only if both the amount of fuel currently supplied to the engine (FC) is equal to or greater than said reference value (REF) and the rate of change of the amount of fuel currently supplied to the engine is positive.

11. The method of claim 10, wherein said second rate of engagement is the most rapid rate of engagement available for engaging said clutch.

12. The method of claim 7, wherein said processing unit comprises means to calculate the value of the rate of change of the amount of fuel currently supplied to the engine (dFC/dt) and after the engine speed (N) has been caused to equal and be maintained at the target engine speed value (A), causing said clutch to be engaged at said second rate of engagement only if both the amount of fuel currently supplied to the engine (FC) is equal to or greater than said reference value (REF) and the rate of change of the amount of fuel currently supplied to the engine is positive.

13. The method of claim 12, wherein said second rate of engagement is the most rapid rate of engagement available for engaging said clutch.

14. The method of claim 2, wherein said second rate of engagement is the most rapid rate of engagement available for engaging said clutch.

15. The method of claim 1, wherein said reference value is in the range of 5% to 35% of the value of the maximum amount of fuel which can be supplied to the engine.

16. The method of claim 3 wherein said reference value (REF) is a function of the value (THL) of the operator setting of the throttle.

17. The method of claim 3 wherein said first rate of clutch engagement is a function of the gear ratio of the transmission in the start from stop operation.

18. The method of claim 4 wherein said first rate of clutch engagement is a function of the gear ratio of the transmission in the start from stop operation.

19. The method of claim 3, wherein said processing unit comprises means to calculate the value of the rate of change of the amount of fuel currently supplied to the engine (dFC/dt) and after the engine speed (N) has been caused to equal and be maintained at the target engine speed value (A), causing said clutch to be engaged at said second rate of engagement only if both the amount of fuel currently supplied to the engine (FC) is equal to or greater than said reference value (REF) and the rate of change of the amount of fuel currently supplied to the engine is positive.

20. The method of claim 3, wherein said reference value is in the range of 5% to 35% of the value of the maximum amount of fuel which can be supplied to the engine.

21. The method of claim 16, wherein said reference value is in the range of 5% to 35% of the value of the maximum amount of fuel which can be supplied to the engine.

22. A method for controlling a vehicle start from stop system (10) for vehicles having an operator actuated throttle pedal (24), a fuel control (26) for controlling the amount of fuel supplied to a fuel controlled engine (14), a transmission (12) having a plurality of gear ratio combinations selectively engagable between a transmission input shaft and a transmission output shaft (20), said transmission input shaft being operatively connected to said engine by means of a selectively engagable and disengagable friction clutch (16), said start from stop system comprising an information processing unit (42) having means for receiving a plurality of input signals including an input (N) signal indicative of the rotational speed of the engine and an input signal (THL) indicative of the operator setting of the throttle pedal or a function of the amount of fuel supplied to the engine, said processing unit including means for processing said input signals in accordance with predetermined logic rules for determining a reference value (REF) equal to a predetermined percentage of the maximum amount of fuel supplied to the engine and for generating command output signals whereby said system is operated in accordance with said logic rules, and means (26, 30, 34) associated with said system effective to actuate said transmission system in response to said command output signals from said processing unit;

said processing unit having means to sense vehicle start from stop operation and, in a vehicle start from stop operation, issuing command output signals to clutch control means (30) for controlling the rate of engagement of said clutch and to fuel control means (26) for controlling the amount of fuel (FC) supplied to said engine; the method characterized by:

setting a target engine speed value (A) as a function of the operator setting (THL) of the throttle pedal (138, 140);

modulating the amount of fuel supplied to the engine to cause the engine speed to rapidly, in a damped manner, substantially equal said target engine speed and then modulating the amount of fuel to said engine to cause said engine speed to be maintained at said target engine speed value (146, 148); and causing said clutch to engage at a first rate of engagement (106) until engine speed (N) has been caused to equal and be maintained at said target value (A) and the amount of fuel (FC) currently being supplied to the engine is equal to or greater than said reference value (REF), then causing said clutch to be engaged at a second (126) more rapid rate of engagement.

23. The method of claim 22 wherein said first rate of engagement is a function of the value (THL) of the operator's setting of the throttle.

24. The method of claim 22 wherein said first rate of engagement increases with increases in the value (THL) of the operators setting of the throttle.

25. The method of claim 22 wherein said reference value (REF) is a function of the value (THL) of the operator setting of the throttle.

26. The method of claim 22 wherein said first rate of clutch engagement is a function of the gear ratio of the transmission in the start from stop operation.

27. The method of claim 22 wherein said first rate of engagement is a relatively slow rates of engagement selected to provide relatively smooth start from stop operations.

28. The method of claim 22, wherein said reference value (REF) is a function of the transmission engaged ratio utilized for start from stop operations.

29. The method of claim 22, wherein said processing unit comprises means to calculate the value of the rate of change of the amount of fuel currently supplied to the engine (dFC/dt) and after the engine speed (N) has been caused to equal and be maintained at the target engine speed value (A), causing said clutch to be engaged at said second rate of engagement only if both the amount of fuel currently supplied to the engine (FC) is equal to or greater than said reference value (REF) and the rate of change of the amount of fuel currently supplied to the engine is positive.

30. The method of claim 22, wherein said second rate of engagement is the most rapid rate of engagement available for engaging said clutch.

31. The method of claim 25 wherein said processing unit comprises means to calculate the value of the rate of change of the amount of fuel currently supplied to the engine (dFC/dt) and after the engine speed (A) has been caused to equal and be maintained at the target engine speed value (A), causing said clutch to be engaged at said second rate of engagement only if both the amount of fuel currently supplied to the engine (FC) is equal to or greater than said reference value (REF) and the rate of change of the amount of fuel currently supplied to the engine is positive.

* * * * *